United States Patent [19]

Montierth

[11] 4,416,675

[45] Nov. 22, 1983

[54] HIGH CAPACITY SOLID PARTICULATE FILTER APPARATUS

[75] Inventor: Max R. Montierth, Elmira, N.Y.

[73] Assignee: Corning Glass Works, Corning, N.Y.

[21] Appl. No.: 350,993

[22] Filed: Feb. 22, 1982

[51] Int. Cl.³ .............................................. B01D 39/20
[52] U.S. Cl. .............................. 55/502; 55/523;
   55/DIG. 30; 210/510.1; 422/180; 60/311
[58] Field of Search ................... 55/523, 484, DIG. 5,
   55/DIG. 30, 502; 210/510; 422/171, 180;
   60/295, 299, 311; 252/477 R; 501/112, 119, 80;
   428/116–118; 165/8; 29/163.5 F

[56] References Cited

U.S. PATENT DOCUMENTS

| | | | |
|---|---|---|---|
| 3,739,553 | 6/1973 | Aine | 55/DIG. 30 |
| 4,041,591 | 8/1977 | Noll et al. | 55/523 |
| 4,041,592 | 8/1977 | Kelm | 55/523 |
| 4,142,864 | 3/1979 | Rosynsky et al. | 422/180 |
| 4,264,346 | 4/1981 | Mann | 55/DIG. 30 |
| 4,276,071 | 6/1981 | Outland | 55/523 |
| 4,329,162 | 5/1982 | Pitcher, Jr. | 55/523 |

FOREIGN PATENT DOCUMENTS 42301 12/1981 European Pat. Off. ...... 55/DIG. 30

*Primary Examiner*—David L. Lacey
*Attorney, Agent, or Firm*—R. N. Wardell

[57] ABSTRACT

A honeycomb filter having improved particulate capacity is provided by forming the filter from a matrix of thin interconnected porous walls defining a plurality of cells extending between opposing inlet and outlet end faces and closed near the outlet end face and, preferably, a porous outer skin surrounding the matrix of thin walls and extending between the inlet and outlet end faces of the filter. The thin walls and porous skin, if provided, have interconnected open porosity of a volume and size sufficient to enable the fluid to pass into and through the thin walls and skin to and through the outlet end face of the filter and/or to pass across the thickness of the porous skin (if provided) between the interior and exterior of the filter, while entrapping at least a significant portion of the solid particulates present in the fluid. The described filters may be formed from ceramic materials having primarily cordierite crystal phases for moderately high (up to at least 1200° C.) temperature filtering applications.

12 Claims, 4 Drawing Figures

HIGH CAPACITY SOLID PARTICULATE FILTER APPARATUS

BACKGROUND OF THE INVENTION

The invention relates to apparatus for filtering solid particulate matter from fluids and, in particular, to improved filters formed from thin, porous walled honeycomb structures and means for mounting the filters for advantageous operation.

The removal of solid particulate matter from fluids (gases or liquids) in which they are mixed is typically accomplished by means of filters made from solid materials formed into articles or masses and having a plurality of pores (which may be interconnected) extending through them of a small cross-sectional size such that the solid materials are both permeable to the fluids and capable of restraining all or at least a substantial portion, as desired, of the solid particulate matter carried by the fluid from passing through the article or mass. Such pores constitute what is termed "open porosity" or "accessible porosity". The minimum cross-sectional size of some or all of the pores can be larger than the size of some or all of the particulates to be filtered, but only to the extent that all or significant amounts of sufficiently large particulates become trapped on the inlet surfaces and/or within the pores during the transit of the fluid through the article or mass.

A pending application Ser. No. 165,646, filed July 3, 1980, assigned to the assignee of this application, describes honeycomb filters preferably formed from extruded and sintered ceramic materials which may be used for removing carbonaceous particulates from diesel engine exhaust gases and for other high temperature fluid filtering applications. The filters are of honeycomb structure each comprising a matrix of thin, porous interconnected walls which define inlet and outlet end faces on opposing outer walls of the filter and a plurality of hollow passages or cells which extend through the filter body between the inlet and outlet end faces. The thin, porous cell walls may form the outer wall of the filter body between the end faces but more typically, a somewhat thicker, smooth continuous outer wall or skin is provided surrounding the matrix of thin walls for strength, uniform outer dimensioning, etc.. One end of each of the cells is blocked to form groups of inlet and outlet cells, the cells of the inlet group each being open at the inlet end face and blocked near the outlet end face and the cells of the outlet group each being blocked near the inlet end face and open at the outlet end face. The inlet and outlet cells are alternated in a checkered fashion so as to adjoin one another and share in common the thin porous walls which define each of the cells. A contaminated fluid introduced under pressure to the inlet end face passes into the filter body through the inlet cells and is forced across the narrow dimension of the thin porous walls, which trap the solid particulates present in the fluid, into adjoining outlet cells through which the now cleansed fluid exits the filter body. At least a substantial portion of the particulates are deposited on the thin wall surfaces of the inlet cells or are trapped in the pores within these walls.

Various methods have been employed to increase the capacity of a filter of given honeycomb geometry. One method described and claimed in a copending application Ser. No. 350,995 filed on the same date as this application and assigned to the assignee hereof, is to provide a filter formed from a matrix of thin, porous interconnected walls having interconnected open porosity of a volume and size sufficient to enable fluid to flow through the thin walls in both their narrow and longer dimensions between adjoining and/or neighboring inlet and outlet cells while preventing at least a substantial portion of the solid particulates in the fluid from flowing entirely through or across the thin walls in any direction and to additionally asymmetrically allocate the thin wall surface areas to provide greater collective inlet cell than outlet cell thin wall surface areas. In yet another pending application Ser. No. 351,126 filed on the same date as this application and assigned to the assignee hereof, a filter was provided for moderately high temperature use having a porous outer wall or skin surrounding the filter's matrix of thin walls and extending between its end faces and was mounted for use so as to enable fluid to flow across the thickness (i.e. narrow dimension) of the skin over a substantial portion of its surface area thereby reducing the likelihood of thermal gradients being formed near the skin and in the peripherally located cells of the filter. The invention also had the effect of increasing the filtration surface area of the filter and its particulate capacity.

SUMMARY OF THE INVENTION

It is an object of this invention to improve the capacity of a honeycomb solid particulate filter of given geometry.

It is yet another object to increase the useful operating life of a honeycomb solid particulate filter of given geometry.

According to the invention, these and other objects are accomplished by providing a solid particulate filter of honeycomb structure comprising a matrix of thin porous interconnected walls defining an open inlet end face and an opposing outlet end face of the filter and a plurality of cells extending through the filter between the inlet and outlet end faces. Ends of all of the cells are open at the inlet end face and closed near the outlet end face. The thin walls are provided with interconnected open porosity of a volume and size sufficient to enable the contaminated fluid to flow through their longer dimensions to and through the outlet end face of the filter while preventing at least a significant portion of the solid particulate in the fluid from passing completely through the thin walls and through the outlet end face of the filter. For diesel engine exhaust gas filtering applications a significant portion may range from about one-half (by weight) to substantially all of the particulates in the exhaust gas.

According to yet another aspect of the invention, additional capacity may be provided to the filter by surrounding the matrix of thin walls with a porous outer wall or "skin" extending between the inlet and outlet end faces and also having an interconnected open porosity of a volume and size sufficient to enable the fluid to flow across the narrow dimensions and, preferably, through the longer dimensions of the skin while preventing at least a substantial portion of the solid particulates in the fluid from passing either entirely across or through the skin.

According to another aspect of the invention, the filter is used with conduit means which transports particulate contaminated fluid to the inlet end face and filtered fluid from the outlet end face of the filter and further allows the fluid to access a substantial portion of the exterior surface of the filter skin for filtration therethrough. Sealing means are typically provided between the filter and an inner surface of the conduit means to prevent contaminated fluid from bypassing the filter. Preferably the sealing means contacts the inner conduit surface and a small portion of the skin near one of the filter end faces allowing a substantial portion of the skin to be exposed to the fluid. Locating the sealing means near the inlet end face causes the contaminated fluid in the cells located at the periphery of the end faces to flow outwardly through the skin and along the gap between filter and the conduit means past the outlet end face. Sealing means may also be located near the filter's outlet end face to cause contaminated fluid to enter the skin from the interior and exterior of the filter so as to maximize the surface area of the skin used for filtration.

According to yet another aspect of the invention, the open porosity of the thin walls and porous skin, if provided, to allow fluid flow through their longer dimensions should be at least 30% by volume and preferably, at least 40% or more by volume.

According to yet another aspect of the invention, the open porosity of the thin walls and porous outer wall, if provided, is formed by pores having mean diameters greater than about 0.1 microns.

According to yet another aspect of the invention, the thin walls are greater than about 0.25 mm. and preferably at least about 0.6 mm. thick to support fluid flow through the longer dimensions of the thin walls.

For diesel exhaust gas particulate filtration, the open porosity of thin walls and skin of filters formed according to the present invention are preferably formed by pores having mean diameters lying between about 20 and 60 microns and a transverse cross-sectional cellular densities of less than about 15.5 cells/cm.$^2$ or less.

BRIEF DESCRIPTION OF THE DRAWINGS

The invention is hereinafter described with reference to the attached figures in which.

DETAILED DESCRIPTION OF THE INVENTION

Figure 1:
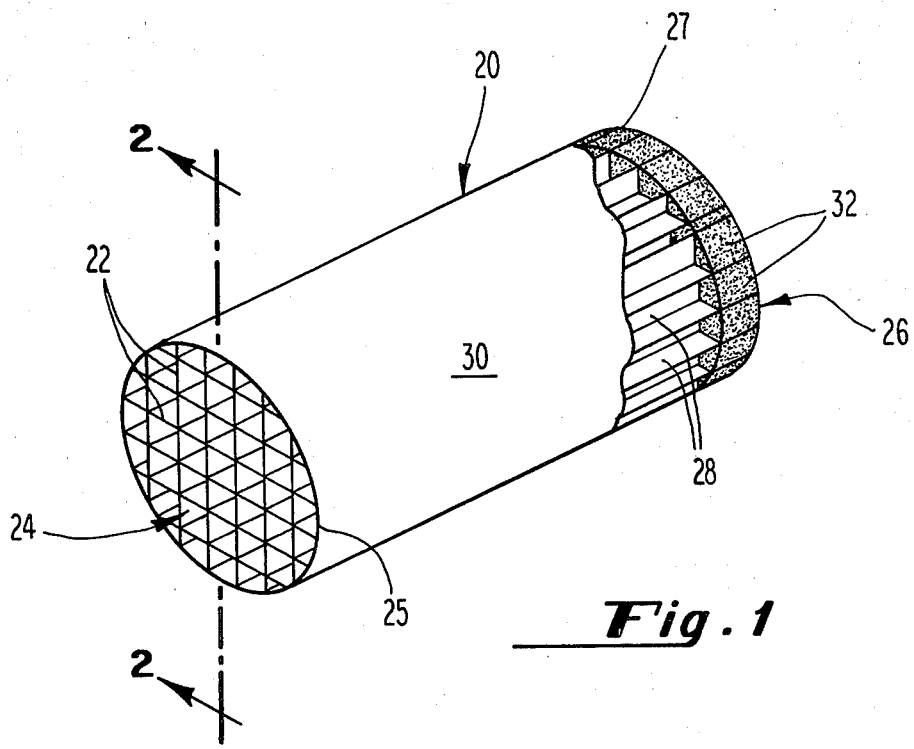
FIG. 1 is a diagrammatic profile view of a honeycomb filter according to the present invention having its outer longitudinally extending wall or skin partially broken away to reveal some of the peripherally located cells and the plugs formed therein at the outlet end face.

It is my invention to maximize the particulate loading capacity of a honeycomb filter of given configuration and geometry by utilizing all of its porous walled surfaces as inlet filtration surfaces. Accordingly, an exemplary honeycomb filter 20, depicted in FIGS. 1 through 4, is provided having a matrix of intersecting, thin porous walls 22 defining an inlet end face 24 in an outlet end face 26 on opposite sides of the filter 20 and a plurality of hollow, open-ended passages or cells 28 extending through the filter 20 between the inlet and outlet end faces 24 and 26. A smooth, porous outer wall or skin 30 has been provided extending around the matrix of thin walls 22 and between the end faces 24 and 26. The skin 30 forms a portion of the cells 28 located around the edge or periphery 25 of the end faces 24 and 26. The interconnected thin walls 22 are provided with internal interconnected open porosity of a volume and size sufficient to enable fluid to enter and flow along their longer dimensions to and through the outlet end face 26 of the filter 20 while preventing at least a significant portion of the solid particulates in the fluid from flowing through the thin walls 22 to and through outlet end face 26 of the filter 20. The skin 30 is also provided with internal interconnected open porosity of a volume and size which allows the fluid to flow into and across the narrow dimension or thickness of the skin 30 (i.e. between the interior and the exterior of the filter 20) and, preferably, into and through the skin 30 in its longer dimension to and through the end face 26 while preventing the flow of particulates therethrough. The cells 28 have been closed at their ends near the outlet end face 26 by plugs 32 or other suitable closure means to prevent the contaminated fluid from flowing unrestrictedly through the filter 20. Closing all of the cells 28 at the outlet end face 26 maximizes the filtration surface area of the thin walls 22 as all exposed surfaces of the thin walls 22 (i.e. those surfaces not covered by the plugs 32) are used for filtration.

Figure 2:
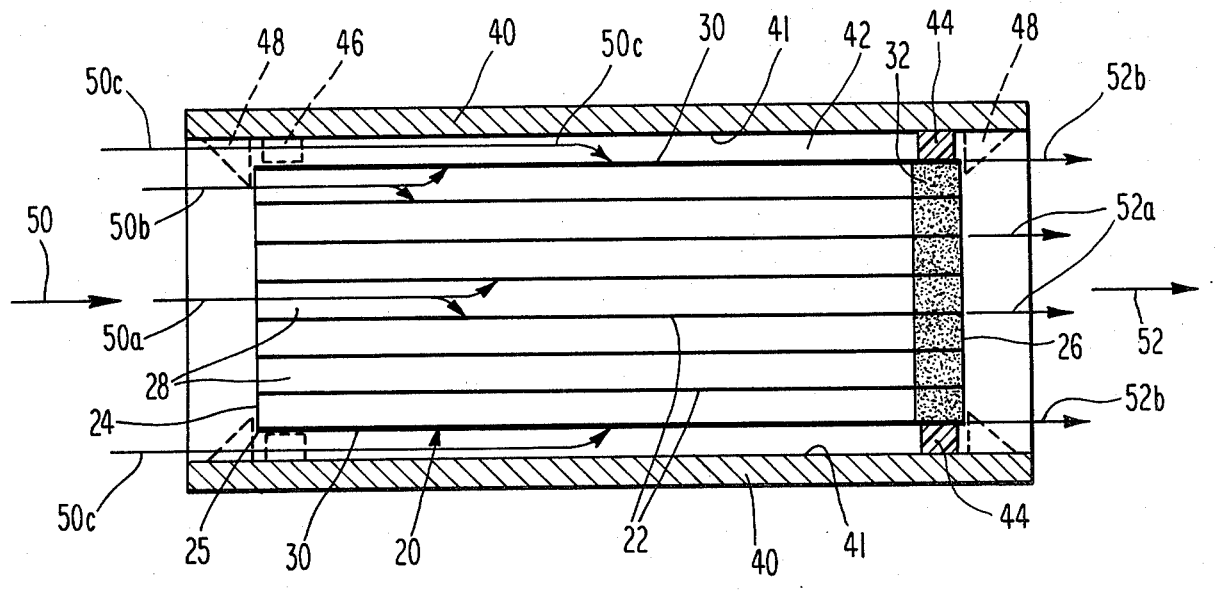
FIG. 2 depicts in a longitudinally sectioned view the filter of FIG. 1 in a conduit mounting configuration utilizing the interior and exterior surfaces of the outer skin of the filter for filtration.
Figure 3:
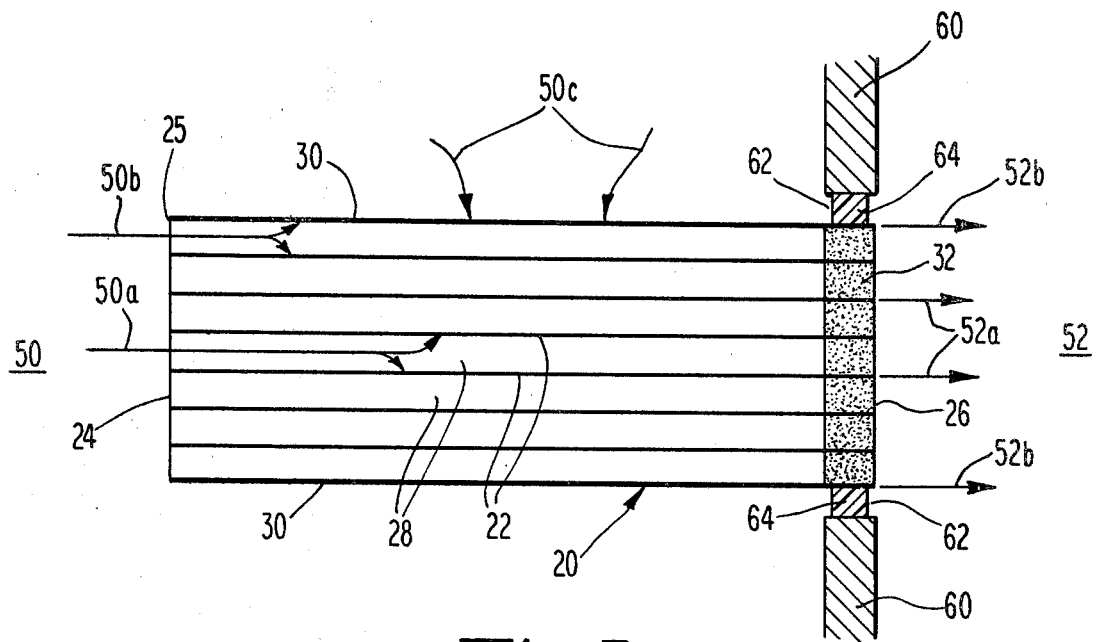
FIG. 3 depicts diagrammatically an alternate type of conduit mounting configuration for providing filtration through the interior and exterior surfaces of the outer skin of the filter.
Figure 4:
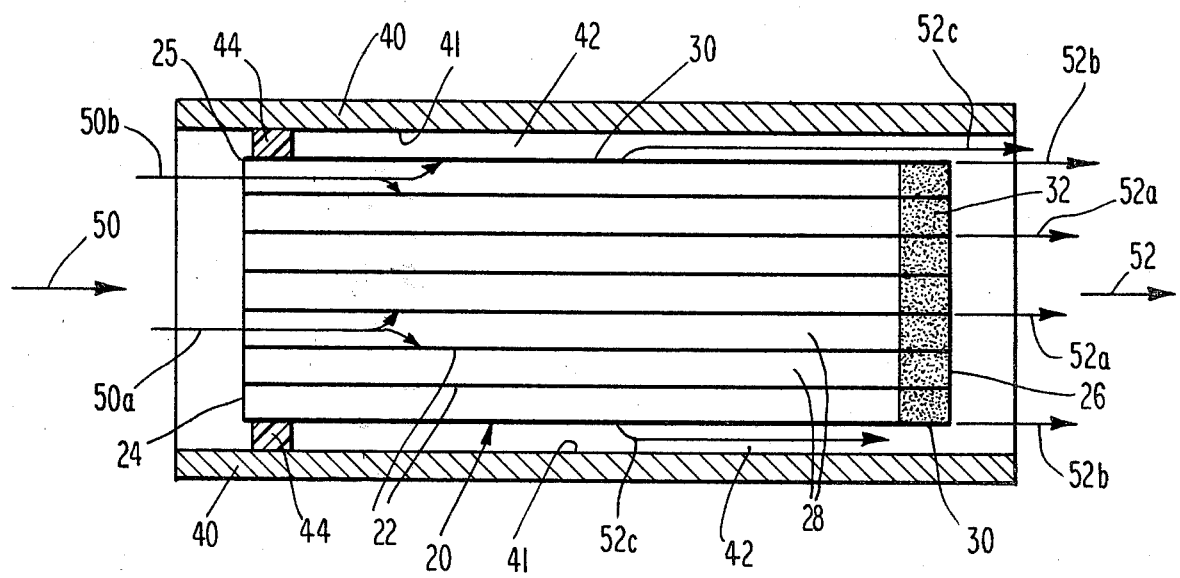
FIG. 4 depicts diagrammatically the filter of FIG. 1 in an alternate conduit mounting configuration which provides filtering by fluid flow primarily across the thickness of the skin of the filter.

FIGS. 2 through 4 depict diagrammatically various ways of mounting the filter body 20 of FIG. 1 for use. Conduit means of some type is used to channel contaminated fluid to and filtered fluid away from the filter body 20. Generally speaking, in each figure the filter 20 is located within the conduit means and across the flow of fluid with its inlet end face directed upstream. FIG. 2 depicts diagrammatically a section of tubular conduit 40 surrounding an exemplary filter body 20 of FIG. 1 which has been sectioned along the line 2—2 to reveal plugs 32 formed at the outlet end face portion of all of its cells 28. According to the invention, a gap 42 is provided between the skin 30 of the filter 20 and an inner surface 41 of the conduit 40 so as to enable fluid to flow along the outside of the filter 20. A seal is formed by suitable means 44 provided across the gap 42 between the surface 41 and skin 30 of the filter 20. The sealing means 44 completely encircle the filter 20 to prevent contaminated fluid in the gap 42 from flowing past the outlet end face 26 of the filter 20 and into the filtered fluid flowing from the outlet end face 26 of the filter body 20. The sealing means 44 are preferably located near the outlet end face 26 of the filter 20 so as to allow contaminated fluid to access and flow through a substantial portion of the outer wall area of the skin 30. The sealing means 44 may be sufficiently rigid to center and fix the position of the filter 20 with respect to the conduit 40 maintaining the gap 42 therebetween. If desired, additional suitable means such as pylons 46, depicted in phantom, may be provided between the conduit means 40 and skin 30 of the filter 20 to center and fix the position of the filter 20. If also desired, means such as tabs 48, also depicted in phantom, may be provided between the conduit 40 and the end faces 24 and/or 26 so as to fix the longitudinal position of the filter 20 with respect to the conduit 40. In either case, means 46 and/or 48 should not fill any substantial portion of the gap 42 and should not offer any significant resistance to flow of the fluid into the gap 42 and along the surface 30 or into the cells 28 at the inlet end face 24.

FIG. 3 depicts an alternate method of employing the filter 20 to maximize its solid particulate capacity. Here, the filter 20 has been positioned between a first reservoir 50 of contaminated fluid and a second reservoir 52 of filtered fluid held by suitable conduit means which includes a wall 60 separating the reservoirs 50 and 52. An opening 62 has been provided through the wall 60 within which the filter 20 is positioned. Separate seal means 64 may be formed across the opening 62 between the wall 60 and the skin 30 of the filter 20 or, alternatively, a contact seal may be formed between the filter 20 and wall 60 by suitably contouring the outlet end portion of the filter 20 and the surface of the opening 62 (not depicted). Again, if desired, additional means for centering and fixing the position of the filter 20 with respect to the wall 60 may be provided (although not depicted in FIG. 3). Again these means should not cover any substantial area of the inlet end face 24 or skin 30 or otherwise restrict access of the contaminated fluid to those areas. The aforesaid copending application Ser. No. 351,126, which discusses in greater detail the mounting of filters in conduit means so as to allow fluid access to the exterior surface of their skins, is incorporated by reference.

FIG. 4 depicts yet another possible manner for mounting the filter 20 of FIG. 1 for use. Again, tubular conduit means 40 have been provided surrounding the filter 20 with an annular gap 42 formed between the skin 30 of the filter and the inner surface 41 of the conduit means 40. Sealing means 44 have now been provided between the skin 30 and inner conduit means surface 41 near the inlet end face 24 of the filter 20. Again, if desired, support means 46 or 48 similar to those in FIG. 2, may be provided to center and/or fix the position of the filter 30 within the conduit 40.

Fluid flow through each of the filters 20 in FIGS. 2 through 4 are depicted in a similar fashion. Contaminated fluid 50 is introduced to the inlet end face 24 of each filter 20. For describing its filtration through the filters 20 the contaminated fluid 50 may be thought of as having three components. A first component, represented by the arrows 50a, passes into the inner (i.e. non-peripherally located) inlet cells 24 of the filter 20 and enters each of the thin walls 22 defining each inner inlet cell 24 passing along the lengths of those thin walls past the plugs 32 to and through the outlet end face 26. Filtered fluid passing through these thin walls 24 and past the plugs 32 from the outlet end face 26 is identified representatively by the arrows 52a. Another portion of the contaminated inlet flow, represented by the arrows 50b, enters the inlet cells located at the periphery 25 of the end face 24 which are formed in part by the skin 30 and passes into the thin porous walls 24 defining those cells and the skin 30. The portion of the contaminated fluid 50b passing into the interconnected thin walls 24 also passes through the plugs 32 at the outlet end face 26 and emerges as a portion of the filtered outlet flow 52a. The portion of the flow 50b entering the skin 30 through the peripherally located inlet cells 24 passes within the longer dimensions of the skin 30 to and through the end face 26 where a now filtered fluid emerges from the thin dimension of the skin 30 exposed at the end face 26. This flow is represented by the lined arrows 52b. In FIGS. 2 and 3, a portion of the contaminated fluid, represented by the arrows 50c, also enters the skin 30 through its exterior surface, and again passes through the longer dimensions of the skin 30 to and through the outlet end face 26 where it emerges as a portion of the filtered flow 52b from the narrow dimension of the skin 30 exposed at the end face 26. In FIG. 4, due to the location of the sealing means 44 near the inlet end face 24 of the filter, a portion of the contaminated fluid 50b entering those inlet cells 22 which are formed in part by the skin 30 passes across the thickness (i.e. narrow dimension) of the skin 30 and into the gap 42 formed between the inner surface 41 of the conduit means 40 and the skin 30. This flow is represented by the lined arrows 52c in FIG. 4 and indicates the passage of that portion of the filtered fluid through the gap 42 and past the end face 26 of the filter body where it merges with the remainder of the filtered flow 52a and 52b passing through the thin, porous walls 22 and skin 30. As contaminated fluid is not allowed access to the outer wall of the skin 30 of the filter 20 in the mounting embodiment depicted in FIG. 4, that portion of the skin area is not used for filtration. Thus, this mounting configuration provides slightly less total particulate filtering capacity than do the mounting configurations depicted in FIGS. 2 and 3. There is, however, less resistance to fluid flowing across rather than through the long dimension of the skin 30. It may be desirable in some applications to trade off the additional particulate capacity offered by filtration through both sides of the skin 30 for a somewhat reduced filter pressure drop afforded by filtering fluid across only the thickness of the skin 30.

The skin 30 and matrix of thin interconnected, porous walls 22 of the filter 20 may be formed from any of a variety of materials including glasses, ceramics, (typically crystalline), metallic powders, resins or organic polymers, papers, textile fabrics (with or without fillers), etc. and various combinations thereof, such as cermets and glass-ceramic mixtures, by a variety of methods depending upon the material(s) selected. The porous interconnected thin walls 22 necessary for practicing the invention and the preferred porous skin 30 are preferably formed from sinterable, finely divided particles and/or short length fibers of substances that yield a porous, sintered material after being fired to effect their sintering, especially metallic powders, ceramics, glass-ceramic mixtures, cermets and other ceramic-based mixtures. The sinterable materials can be formed into suitable honeycomb structures by methods such as layering, described for example, in U.S. Pat. Nos. 3,112,184 and 3,444,925, a pipe bonding process wherein a large number of sinterable material pipes are bound together with a sinterable outer skin to form the honeycomb structure or, preferably, by extrusion of a plastically formable batch mixture of a sinterable material as is disclosed, for example, in U.S. Pat. Nos. 3,790,654, 3,919,358 and 4,008,033, and in pending commonly assigned application Ser. No. 260,343 filed May 4, 1981, now U.S. Pat. No. 4,364,888, all of which are incorporated by reference. The honeycomb structure (consisting of the matrix of thin walls 22 and surrounding outer skin 30) thus formed, is fired to effect its sintered condition as is disclosed, for example, in U.S. Pat. No. 3,899,326. As desired, any suitable or conventional fugitive or combustible (burn-out) additive (besides volatizable plasticizers and binders used in the preparation of the formable mixture) can be dispersed within the formable and sinterable mixture so as to provide appropriate and adequate interconnected, open porosity in the sintered material of the thin walls 22 and skin 30 formed. This method may be used to form pores having mean diameters of about 1 micron or more although it is believed possible to form pores with mean diameters as small as about 0.1 micron by this method. Desirably, the thin walls 22 and skin 30 are formed monolithically in a single step as a honeycomb substrate by extrusion from the same batch material. The interconnected open porosity of such substrates extends between the thin walls 22 and skin 30. Where interconnected open porosity is thus provided between the matrix of thin walls 22 and skin 30 fluid may also flow between the skin 30 and thin walls 22 as well as through the thin walls 22 and through or across the skin 30.

The ends of the cells 24 may be closed near the outlet end face 26 by plugging, covering or any other suitable technique and with any suitable material in any manner compatible with the material of the thin walls 22 and skin 30 under the envisioned service conditions of the filter 20. This includes non-deleterious reaction to the thin wall and skin material(s), to the solid particulates or to fluid, either singularly or in common, good adhesion to the thin walls and skin, suitable durability to fluid flows at desired flow rates, similar coefficients of thermal expansion (if the filter is to be used at elevated temperatures), etc.. Preferably, plugs 32, as are depicted in FIGS. 1 through 4, are formed in the outlet end portions of the cell 28 from a flowable or plastically formable plugging material. Depending upon the characteristics of the plugging material selected, it may be charged into the cell ends by such techniques as rolling, wiping, squeegeeing, pressure injection or by dipping or pressing the outlet end face 24 into a layer of the plugging material. The plugs 32 or other closure means may be either porous or non-porous although, in the former case, the open porosity (i.e. pore volume and mean pore size) should be sufficiently small as to prevent the passage of at least a significant portion or more, if desired of the solid particulates through or around the plugs 32 and hence, through the filter 20. Regardless of the method and material selected to close the cell ends, the ends of the thin walls 22 and porous skin 30 (if provided) must be exposed at the outlet end face 26 so as to provide an exit means for the filtered fluid.

Where the thin walls 22 and porous skin 30 (if provided) are formed from a sinterable material, compatable sinterable cement mixtures are typically used to form plugs 32 in the cell ends at the outlet end face 26 of the resulting filter 20. A green honeycomb substrate may be used with selected cement mixtures having sintering temperatures close to or above that of the substrates. While it is possible to form usable filters by firing to a temperature where the green substrates are substantially sintered and the plugging material is not substantially sintered but is sufficiently rigidified, such filters are generally not preferred nor as durable as those in which the plugging material is also substantially sintered. Alternatively, a cement having a lower sintering temperature may be charged into a previously fired honeycomb structure having a higher sintering temperature and the cement and structure refired to the lower sintering temperature of the cement.

Dimensional changes (typically shrinkage although possibly expansion) of a green substrate upon sintering and of a plugging material upon drying and/or sintering may be compensated for by the use of a plugging material which foams when fired during sintering, such as the foam-type ceramic cements described in U.S. Pat. Nos. 3,189,512 and 3,634,111 and in commonly assigned application Ser. No. 165,647, filed July 3, 1980 and now U.S. Pat. No. 4,297,140, or a plugging material which undergoes an appropriate net relative expansion with respect to the substrate material during sintering, such as is described and claimed in another copending application Ser. No. 295,612, filed Aug. 24, 1981 and assigned to the assignee hereof, all of which are incorporated by reference. The plugging material need not be sinterable but can be a hardenable or settable material, even in one which no true drying occurs in a "drying" or curing step, which is inorganic and/or organic, is highly resistant to deformation at sintering temperatures of the substrates and exhibits the necessary relative expansion in relation to the substrate as set forth in the aforesaid application Ser. No. 295,612 or, if used with a previously sintered substrate, can be caused to foam or otherwise expand and fill the cell ends without damaging the thin walls or skin of the substrate.

The composition of the thin walls 22, as well as their physical parameters including their dimensions, volumetric open porosity and mean pore size, will vary to satisfy the user's operating requirements such as filter strength, durability and efficiency; contaminant size and concentration; fluid flow rate, density and viscosity; etc. Open porosities of at least 30% by volume and preferably, 40% or more by volume are provided to assure the adequate interstitial flow through the long dimensions of the thin wall. As the described filters can be conveniently formed from sinterable ceramic materials which retain their strength at elevated temperatures, envisioned uses for the invention include hot exhaust gas and hot liquid filters and heat exchangers, as are described, for example in the aforesaid pending application Ser. No. 165,646 incorporated by reference herein.

A particular envisioned use for the present invention is for the entrapment of carbonaceous particulates from diesel engine exhaust gas so as to avoid air pollution by such particulates, which individually can range in size from about 5 down to and below 0.05 microns, especially from the smallest displacement diesel engines which require lower filter efficiencies as is explained in another pending application Ser. No. 353,803, assigned to the assignee hereof filed on even date herewith and incorporated by reference herein. Methods and apparatus from mounting the exemplary filter 10 in diesel engine exhaust systems are described in the copending application Ser. No. 351,126.

Cordierite ceramic materials of the type disclosed in U.S. Pat. Nos. 3,885,977 and 4,001,028 are generally preferred for diesel exhaust solid particulate filters because, as was earlier found in their use as catalytic substrates in internal combustion engine exhaust systems, these materials have properties which enable them to withstand and be durable under the thermal, chemical and physical conditions to which they are subjected in automotive exhaust systems including those with diesel engines. The aforesaid application Ser. No. 165,646 provides batch compositions for extrudable materials which yield various volumetric open porosities and mean pore sizes upon sintering. The honeycomb substrates may be plugged with a maganese/magnesium foam-type cordierite cement also described in the application Ser. No. 165,646, which is preferred for internal combustion engine exhaust and other filtration applications having high sodium ionic concentrations, and which would be used with the previously referred to cordierite honeycomb substrates, after those substrates had been sintered. Alternatively, the referred to cordierite substrates may be charged while in a green state with selected ceramic materials having appropriate relative expansion characteristics, as is described and claimed in the aforesaid application Ser. No. 295,612, and the substrates and plugging material fired in one operation to effect the sintering thereof.

Diesel particulate filtration is envisioned that the filters of this invention would be formed with interconnected thin walls and a porous outer skin at least about 0.10 inches (about 0.25 mm.) and preferably about 0.025 inches (about 0.6 mm.) in thickness or more to provide for sufficient interstitial flow paths but less than about 0.06 inches (1.5 mm.) thick to minimize filter volume. Cell densities should be less than about 100 cells/in$^2$ (about 15 cells/cm.$^2$). The interconnected open porosity of the thin walls and skin is at least about 30% and preferably at least about 40% (by volume) and is formed by pores having mean diameters greater than about 1 micron and preferably between about 20 and 60 microns. If volumetric open porosity exceeds about 70% the mechanical strength at the filter may be compromised. The indicated porosity may be provided, for example, by the cordierite material composition set forth for Samples J-K of TABLE I of the aforesaid application Ser. No. 165,646.

Other envisioned uses for the described filter include filtration of particulates from solvents at low or moderately high (less than about 1400° C.) temperature applications, biological separations such as blood plasma from red and white corpuscles, and removal of suspended dust particles in certain manufacturing environments.

While various embodiments in the invention have been suggested and modifications thereto have been described, it should be understood that other modifications could be made in the structure, composition and/or arrangement of the described components without departing from the scope of the invention which is more fully described in the following claims.

What is claimed is:

1. In an apparatus for removing solid particulates from fluids, a filter of honeycomb structure comprising:
   a matrix of thin porous interconnected walls defining an open inlet end face and an opposing outlet end face of the filter and a multiplicity of cells extending substantially longitudinally between the inlet and outlet end faces, all of the cells being open at the inlet end face and closed near the outlet end face,
   the thin walls having interconnected open porosity of a volume and size sufficient to enable fluid to enter and flow within the thin walls to and through the outlet end face of the filter and to prevent at least a significant portion of the solid particulates in the fluid from flowing through the thin walls to and through the outlet end face of the filter.

2. The apparatus of claim 1 wherein said filter further comprises an exterior surface formed by a porous outer wall extending around the matrix of thin walls and between the inlet and outlet end faces and having an interconnected open porosity of a volume and size sufficient to enable the fluid to enter and flow across the thickness of the outer wall and to restrict at least a significant portion of the solid particulates in the fluid from flowing across the thickness of the outer wall.

3. The apparatus of claim 2 wherein said interconnected open porosity of said outer wall is also of a volume and size sufficient to allow the fluid to enter and flow along the longer dimensions of the outer wall to and through the outlet end face and to prevent at least a significant portion of the solid particulates in the fluid from flowing through the longer dimensions of the outer wall and outlet end face of the filter.

4. The apparatus of claim 2 further comprising:
   conduit means encircling the filter for transporting contaminated fluid to the inlet end face and filtered fluid from the outlet end face of the filter, and
   sealing means contacting the exterior surface of said filter and an inner surface of said conduit means for preventing the contaminated fluid from bypassing the filter, said conduit means and said sealing means being positioned with respect to the conduit inner surface and the filter outer wall so as to allow fluid to flow over a substantial portion of said exterior surface of said filter.

5. The apparatus of claim 4 wherein said sealing means contact the filter near the outlet end face.

6. The apparatus of claim 5 wherein the cells of said filter are provided in a density of about 15.5 cells/cm.$^2$ or less in a plane perpendicular to central longitudinal axes of the cells.

7. The apparatus of claim 1 wherein the thin wall open porosity is at least 30% by volume.

8. The apparatus of claim 7 wherein said open porosity is formed by pores having mean diameters of at least 0.1 micron.

9. The apparatus of claim 7 wherein said open porosity is at least 40% by volume.

10. The apparatus of claim 9 wherein said open porosity is formed by pores having mean diameters between 20 and 60 microns.

11. The apparatus of claim 10 wherein said filter further comprises an outer wall extending around the matrix of thin walls and between the inlet and outlet end faces, and having an internal interconnected open porosity of at least 40% by volume of the outer wall formed by pores having mean diameters between 20 and 60 microns.

12. The apparatus of claim 1 or 11, wherein said filter is formed from a sintered ceramic material.

* * * * *